US011291078B2

(12) United States Patent
Xiong et al.

(10) Patent No.: US 11,291,078 B2
(45) Date of Patent: Mar. 29, 2022

(54) TRANSMISSION SCHEME FOR COMMON CONTROL MESSAGE WITH MULTI-BEAM OPERATION

(71) Applicant: Apple Inc., Cupertino, CA (US)

(72) Inventors: Gang Xiong, Portland, OR (US); Dae Won Lee, Portland, OR (US); Yushu Zhang, Beijing (CN); Hong He, Sunnyvale, CA (US); Seung Hee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 16/475,765

(22) PCT Filed: Dec. 18, 2017

(86) PCT No.: PCT/US2017/067033
§ 371 (c)(1),
(2) Date: Jul. 3, 2019

(87) PCT Pub. No.: WO2018/128786
PCT Pub. Date: Jul. 12, 2018

(65) Prior Publication Data
US 2019/0357303 A1 Nov. 21, 2019

Related U.S. Application Data

(60) Provisional application No. 62/443,116, filed on Jan. 6, 2017.

(51) Int. Cl.
*H04W 88/02* (2009.01)
*H04B 7/06* (2006.01)
(Continued)

(52) U.S. Cl.
CPC ........ *H04W 88/023* (2013.01); *H04B 7/0695* (2013.01); *H04B 7/088* (2013.01);
(Continued)

(58) Field of Classification Search
CPC ............. H04W 88/023; H04W 56/001; H04W 68/005; H04W 72/0446; H04W 72/1273;
(Continued)

(56) References Cited

U.S. PATENT DOCUMENTS

2013/0121185 A1  5/2013  Li et al.
2013/0272220 A1  10/2013  Li et al.
(Continued)

OTHER PUBLICATIONS

International Search Report dated May 22, 2018 for International Application No. PCT/US2017/067033.
(Continued)

*Primary Examiner* — Jae Y Lee

(57) ABSTRACT

Techniques discussed herein can facilitate communication of common control messages via multi-beam operation. Embodiments discussed herein can include BSs (Base Stations) configured to transmit scheduling information associated with a common control message via a beamformed DL (Downlink) control channel in each symbol of two or more symbols of a slot, wherein the DL control channel is one of a dedicated physical channel or a NR (New Radio) PDCCH (Physical Downlink Control Channel); and transmit the common control message via a DL data channel based at least in part on the scheduling information.

22 Claims, 14 Drawing Sheets

╱— 1300

1310 — RECEIVE SCHEDULING INFORMATION FOR COMMON CONTROL MESSAGE VIA BEAMFORMED CONTROL CHANNEL

1320 — RECEIVE COMMON CONTROL MESSAGE BASED ON SCHEDULING INFORMATION

(51) Int. Cl.

| | | |
|---|---|---|
| *H04B 7/08* | (2006.01) | |
| *H04L 1/00* | (2006.01) | |
| *H04L 1/16* | (2006.01) | |
| *H04L 5/00* | (2006.01) | |
| *H04W 56/00* | (2009.01) | |
| *H04W 68/00* | (2009.01) | |
| *H04W 72/04* | (2009.01) | |
| *H04W 72/12* | (2009.01) | |
| *H04W 74/08* | (2009.01) | |
| *H04W 80/08* | (2009.01) | |
| *H04W 88/08* | (2009.01) | |

(52) U.S. Cl.
CPC .......... *H04L 1/0004* (2013.01); *H04L 1/1642* (2013.01); *H04L 5/0094* (2013.01); *H04W 56/001* (2013.01); *H04W 68/005* (2013.01); *H04W 72/0446* (2013.01); *H04W 72/1273* (2013.01); *H04W 72/1289* (2013.01); *H04W 74/0833* (2013.01); *H04W 80/08* (2013.01); *H04W 88/08* (2013.01)

(58) Field of Classification Search
CPC ......... H04W 72/1289; H04W 74/0833; H04W 80/08; H04W 88/08; H04B 7/0695; H04B 7/088; H04L 1/0004; H04L 1/1642; H04L 5/0094

See application file for complete search history.

(56) References Cited

U.S. PATENT DOCUMENTS

| | | | |
|---|---|---|---|
| 2014/0128109 A1 | 5/2014 | Li et al. | |
| 2018/0084593 A1* | 3/2018 | Chen | H04L 5/0048 |
| 2018/0097609 A1* | 4/2018 | Tiirola | H04L 5/143 |
| 2018/0109345 A1* | 4/2018 | Svedman | H04W 72/042 |
| 2018/0131487 A1* | 5/2018 | Ly | H04L 5/0053 |
| 2018/0192383 A1* | 7/2018 | Nam | H04L 5/0044 |
| 2020/0162212 A1* | 5/2020 | Liu | H04W 72/0453 |
| 2020/0221427 A1* | 7/2020 | Nilsson | H04W 36/0027 |

OTHER PUBLICATIONS

"Discussion on SS Bicok and SS Burst." Source: LG Electronics. Agenda Item: 7.1.2.2. 3GPP TSG RAN WG1 Meeting #87, Reno, USA Nov. 14-18, 2016. R1-1611786. 3 pages.

* cited by examiner

TRANSMISSION SCHEME FOR COMMON CONTROL MESSAGE WITH MULTI-BEAM OPERATION

REFERENCE TO RELATED APPLICATIONS

This application is a National Phase entry application of International Patent Application No. PCT/US2017/067033 filed Dec. 18, 2017, which claims priority to U.S. Provisional Application No. 62/443,116 filed Jan. 6, 2017, entitled "TRANSMISSION SCHEME FOR COMMON CONTROL MESSAGE WITH MULTI-BEAM OPERATION" in the name of Gang Xiong et al. and is hereby incorporated by reference in their entirety.

FIELD

The present disclosure relates to wireless technology, and more specifically to techniques for employing multi-beam operation for transmission of common control messages.

BACKGROUND

Mobile communication has evolved significantly from early voice systems to today's highly sophisticated integrated communication platform. The next generation wireless communication system, 5G (Fifth Generation), or new radio (NR), will provide access to information and sharing of data anywhere, anytime by various users and applications. NR is expected to be a unified network/system that can meet vastly different and sometimes conflicting performance dimensions and services. These diverse multi-dimensional targets for NR are driven by different services and applications. In general, NR will evolve based on 3GPP (Third Generation Partnership Project) LTE (Long Term Evolution)-Advanced with additional potential new Radio Access Technologies (RATs) to enrich peoples' lives with better, simpler and seamless wireless connectivity solutions. NR will enable everything connected by wireless and deliver fast, rich contents and services.

For mid-band (carrier frequency between 6 GHz and 30 GHz) and high-band (carrier frequency beyond 30 GHz), beamforming is one technology that can improve the signal quality and reduce the inter user interference by directing narrowly radiated beaming toward the target users. For mid and high-band system, the path loss caused by weather like rain, fog, or object block, can severely deteriorate the signal strength and damage the performance of the communications. Beamforming gain can compensate for the severe path loss and thereby improve coverage range.

DETAILED DESCRIPTION

Figure 1:
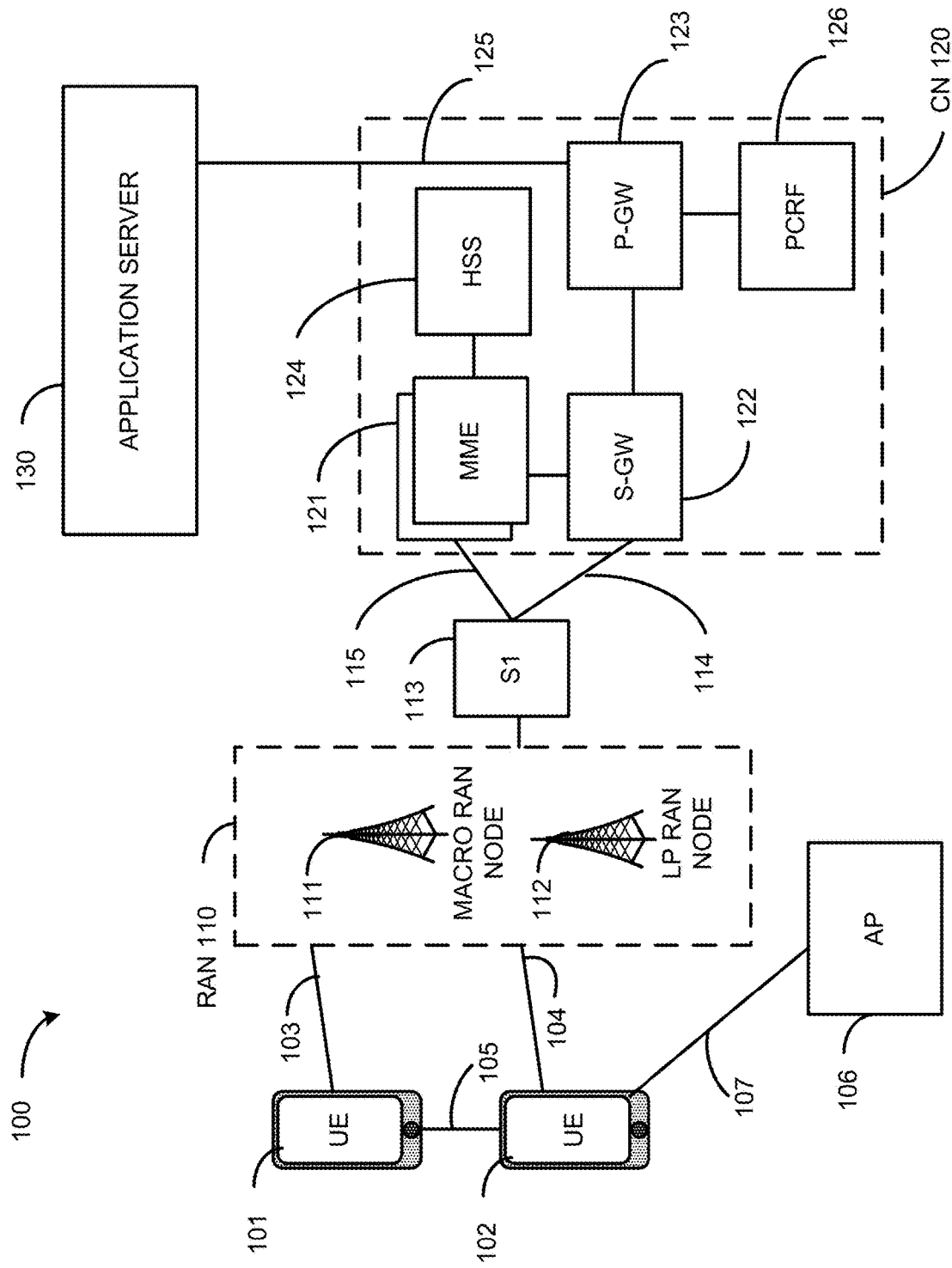
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
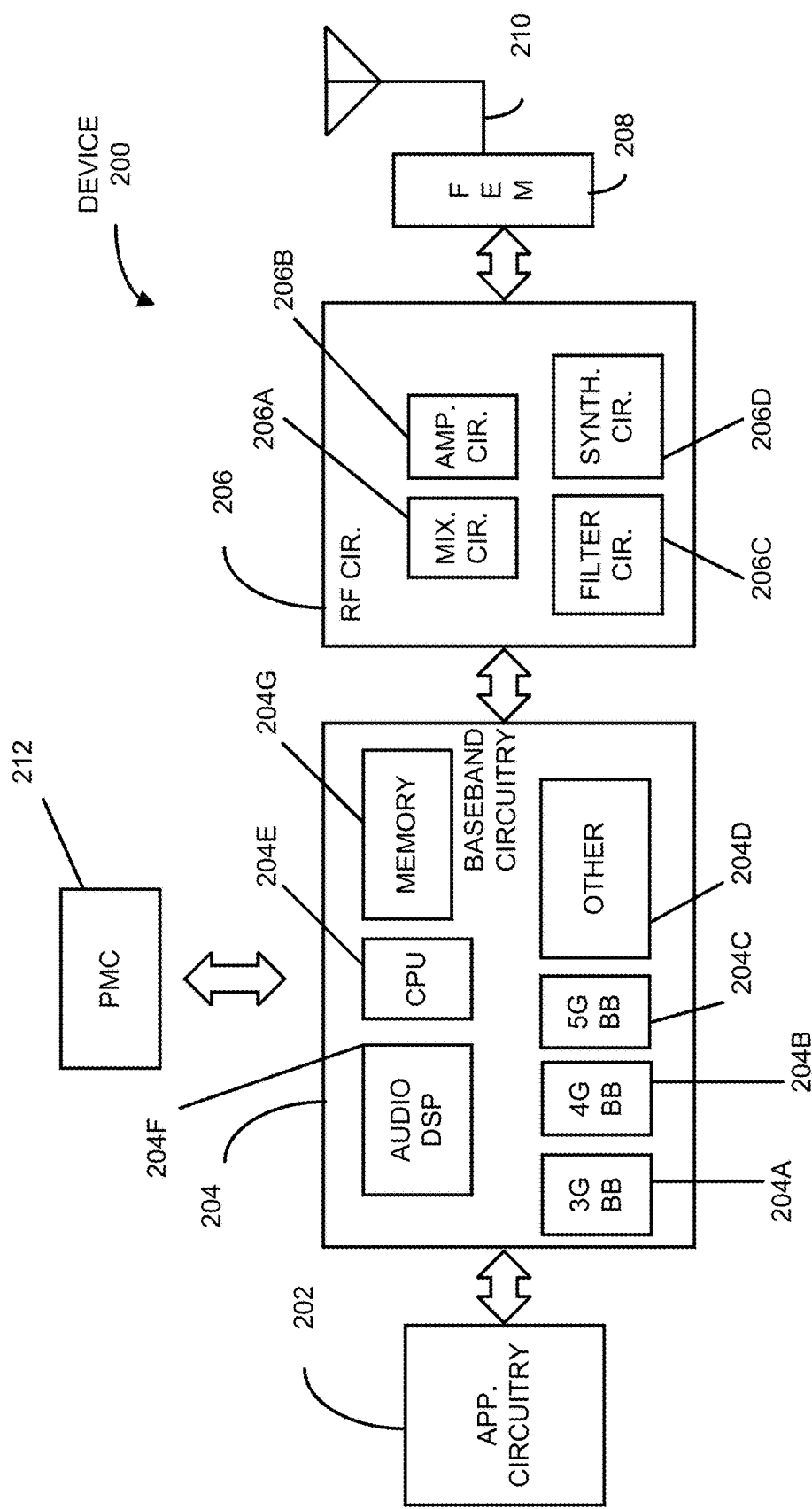
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
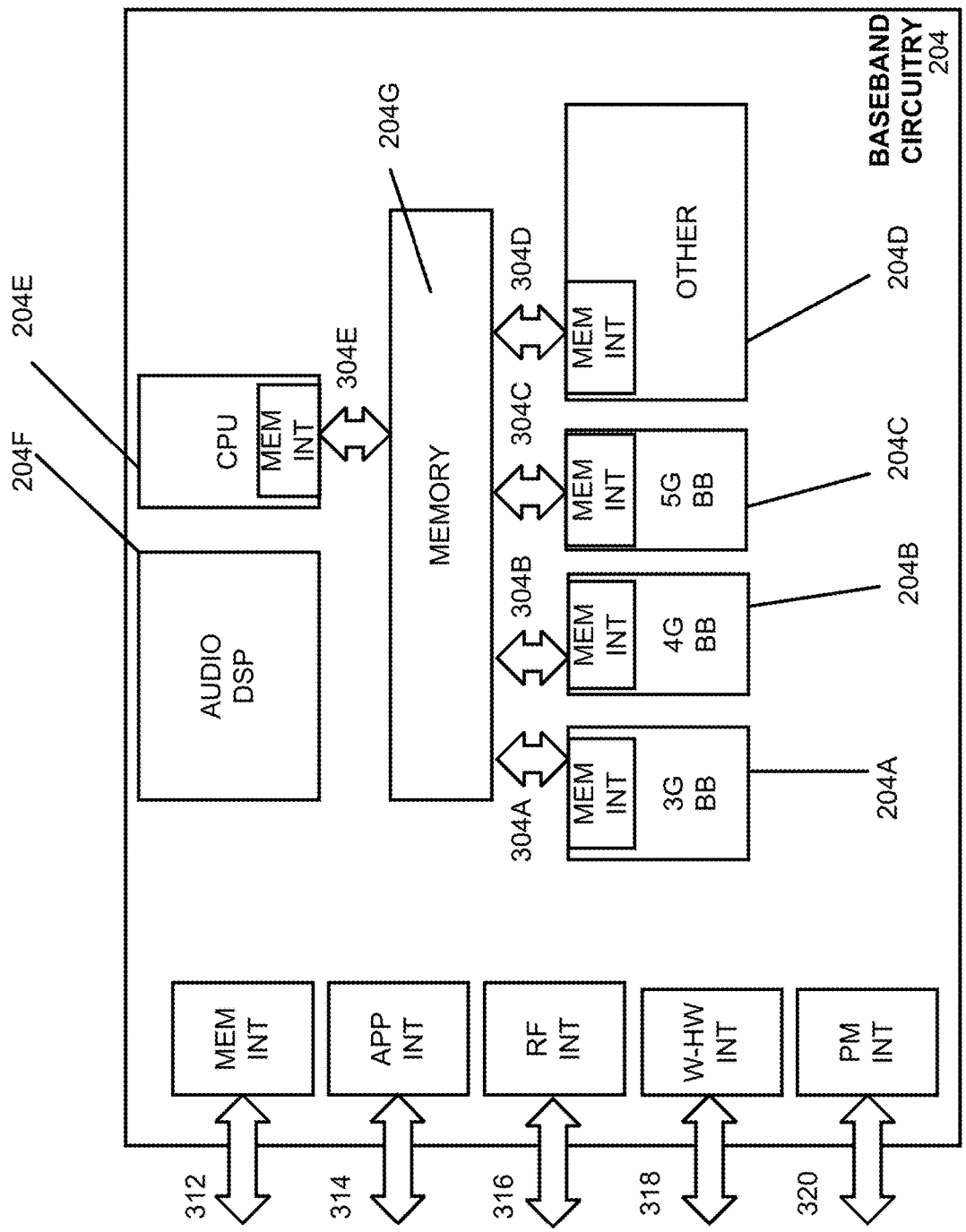
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
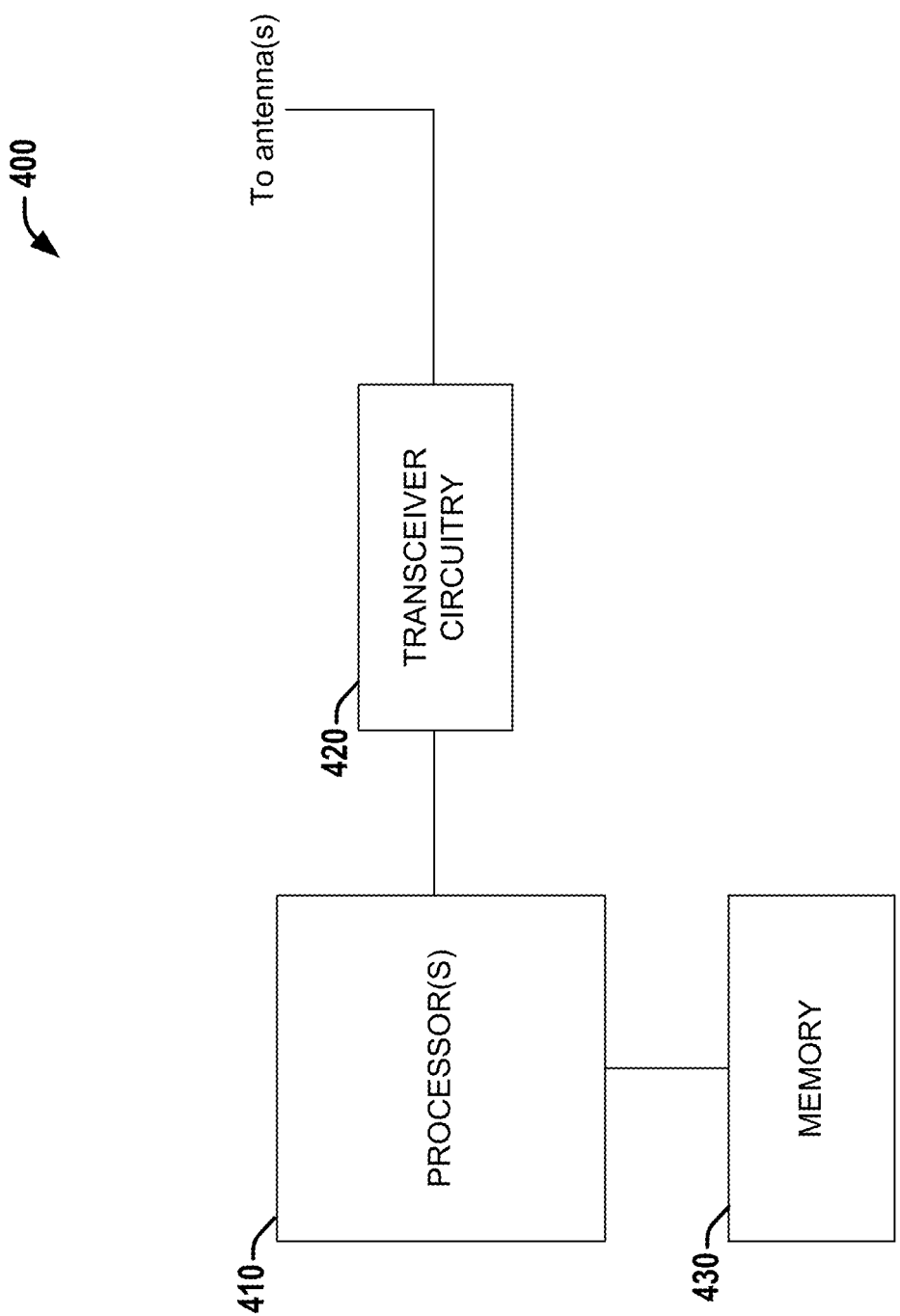
FIG. 4 is a block diagram illustrating a system employable at a UE (User Equipment) that facilitates reception of common control message(s) in connection with beamformed operation, according to various aspects described herein.

Referring to FIG. 4, illustrated is a block diagram of a system 400 employable at a UE (User Equipment) that facilitates reception of common control message(s) in connection with beamformed operation, according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate communication of common control messages in connection with multi-beam operation.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

Figure 5:
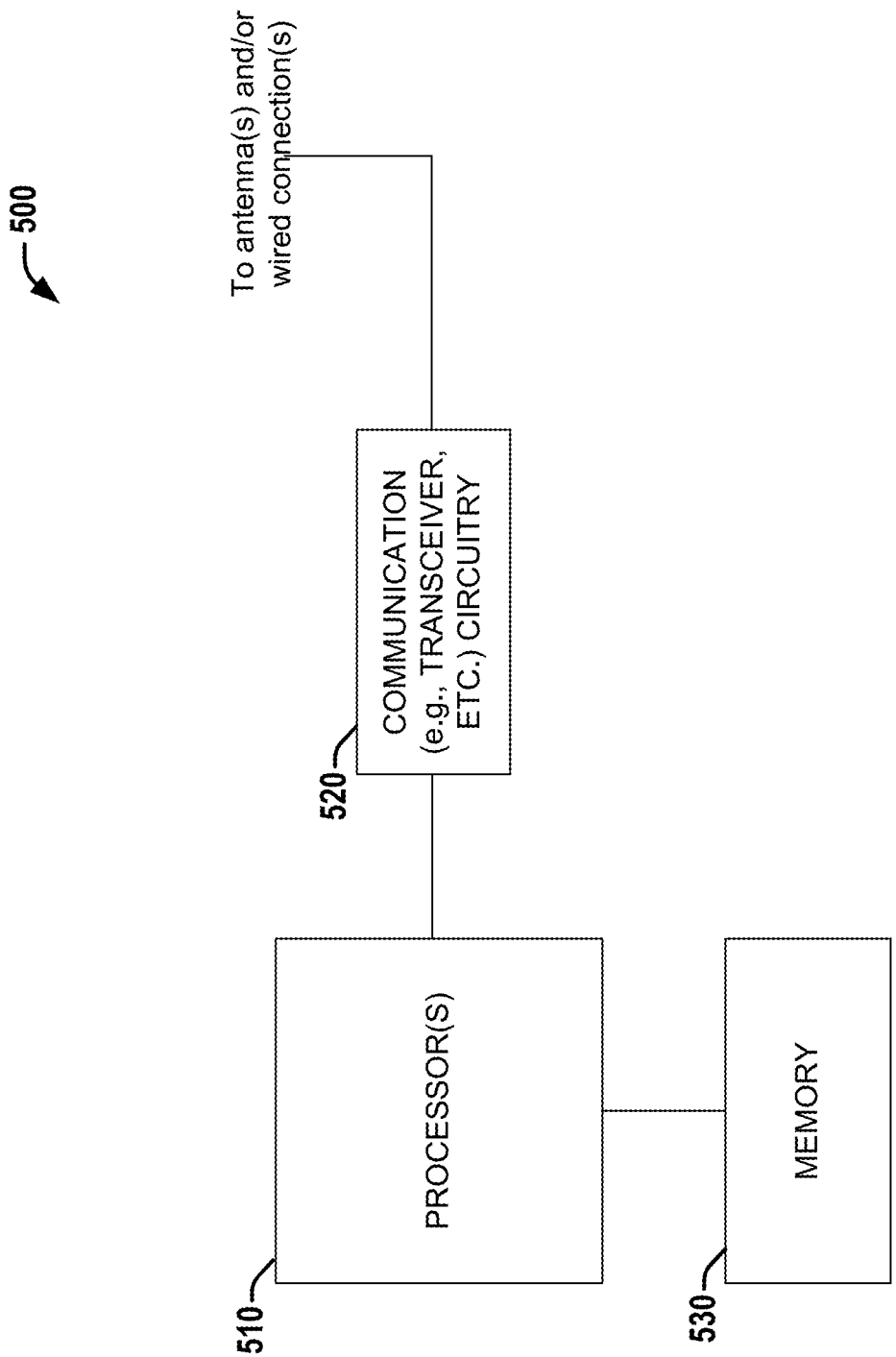
FIG. 5 is a block diagram illustrating a system employable at a BS (Base Station) that facilitates transmission of common control message(s) in connection with multi-beam operation, according to various aspects described herein.

Referring to FIG. 5, illustrated is a block diagram of a system 500 employable at a BS (Base Station) that facilitates transmission of common control message(s) in connection with multi-beam operation, according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate communication of common control messages in connection with multi-beam operation.

At the RAN1 (RAN (Radio Access Network) WG1 (Working Group 1)) #87 meeting, the following agreements were made regarding paging transmission in case of multiple beam operation: "

For paging in multi-beam operation, support beam sweeping for paging, and study the following methods:
Alt-1: Multiplexing paging with SS blocks
FFS: Details of paging
Alt-2: Adding another round of beam sweeping for paging
Note: Another round of beam sweeping is different from the beam sweeping of SS burst set
Other alternatives are not precluded"

In various aspects, a dedicated paging channel can be defined to carry paging messages (e.g., generated by processor(s) 510, transmitted via communication circuitry 520, received via transceiver circuitry 420, and processed by processor(s) 410). Further, the size of the paging message and modulation and coding scheme (MCS) can be one of predefined, fixed in the specification, or configured by higher layers via NR minimum system information (MSI), NR remaining minimum system information (RMSI), NR other system information (OSI) or radio resource control (RRC) signaling (e.g., generated by processor(s) 510, transmitted via communication circuitry 520, received via transceiver circuitry 420, and processed by processor(s) 410). However, this mechanism may not be flexible in term of scheduling, given that the size of the paging message and system information block can vary for different deployment scenarios and use cases. In various aspects discussed herein, to provide more flexibility, a control channel (e.g., generated by processor(s) 510, transmitted via communication circuitry 520, received via transceiver circuitry 420, and processed by processor(s) 410) can be employed to carry certain scheduling information for the transmission of common control message(s) including paging, NR remaining minimum system information (RMSI), NR other system information (OSI) and random access response (RAR) message(s).

In various aspects discussed herein, a transmission scheme and associated techniques are discussed that can be employed for common control message(s) in scenarios where multi-beam operation is employed. In various aspects, the techniques and associated design discussed herein can include: (a) Control channel/signal design carrying scheduling information; and (b) Multiplexing schemes for control channel/signals and a data channel carrying common control message(s).

In LTE, paging message(s) (e.g., generated by processor(s) 510, transmitted via communication circuitry 520, received via transceiver circuitry 420, and processed by processor(s) 410) can include paging record list, system information modification indication, Earthquake and Tsunami Warning service (ETWS) and Commercial Mobile Alert System (CMAS) notification(s). One paging record comprises one paging UE (User Equipment) ID (Identifier/Identity), and the paging UE ID can be the International mobile subscriber identity (IMSI) or S-TMSI (SAE (System Architecture Evolution)-Temporary Mobile Station Identifier). To receive paging message(s), a UE can calculate (e.g., via processor(s) 410) the radio frame (the Paging Frame (PF)) and the subframe within that PF (the Paging Occasion (PO)) and can monitor (e.g., via processor(s) 410) the physical downlink control channel (PDCCH) (as received via transceiver circuitry 420) for Paging Radio Network Temporary Identifier (P-RNTI) value. After successful decoding (e.g., via processor(s) 410) of the PDCCH (Physical Downlink Control Channel) channel, the UE can decode physical downlink shared channel (PDSCH) to acquire the paging record.

For system information transmission, system information blocks (SIBs) are transmitted using PDSCH (e.g., generated by processor(s) 510, transmitted via communication circuitry 520, received via transceiver circuitry 420, and processed by processor(s) 410), which is scheduled by PDCCH (e.g., generated by processor(s) 510, transmitted via communication circuitry 520, received via transceiver circuitry 420, and processed by processor(s) 410). The UE can monitor (e.g., via processor(s) 410) the PDCCH (e.g., received via transceiver circuitry 420) with Cyclic redundancy check (CRC) masked with a system information RNTI (SI-RNTI) for the presence of SIBs. Additionally, the PDCCH carries scheduling information that comprises MCS and resource allocation for the transmission of system information.

For random access response (RAR) message(s) (e.g., generated by processor(s) 510, transmitted via communication circuitry 520, received via transceiver circuitry 420, and processed by processor(s) 410), individual RAR messages of multiple UEs can be combined (e.g., via processor(s) 510) in a single transmission (e.g., via communication circuitry 520) in scenarios where the BS (e.g., eNB, gNB, etc.) detects (e.g., via processor(s) 510 of UL (Uplink) signaling received via communication circuitry 520) multiple PRACH (Physical Random Access Channel) preambles from different UEs. Additionally, RAR is carried in PDSCH, which is scheduled by PDCCH with CRC masked with a random access RNTI (RA-RNTI).

Control Channel Design Carrying Scheduling Information

Figure 6:
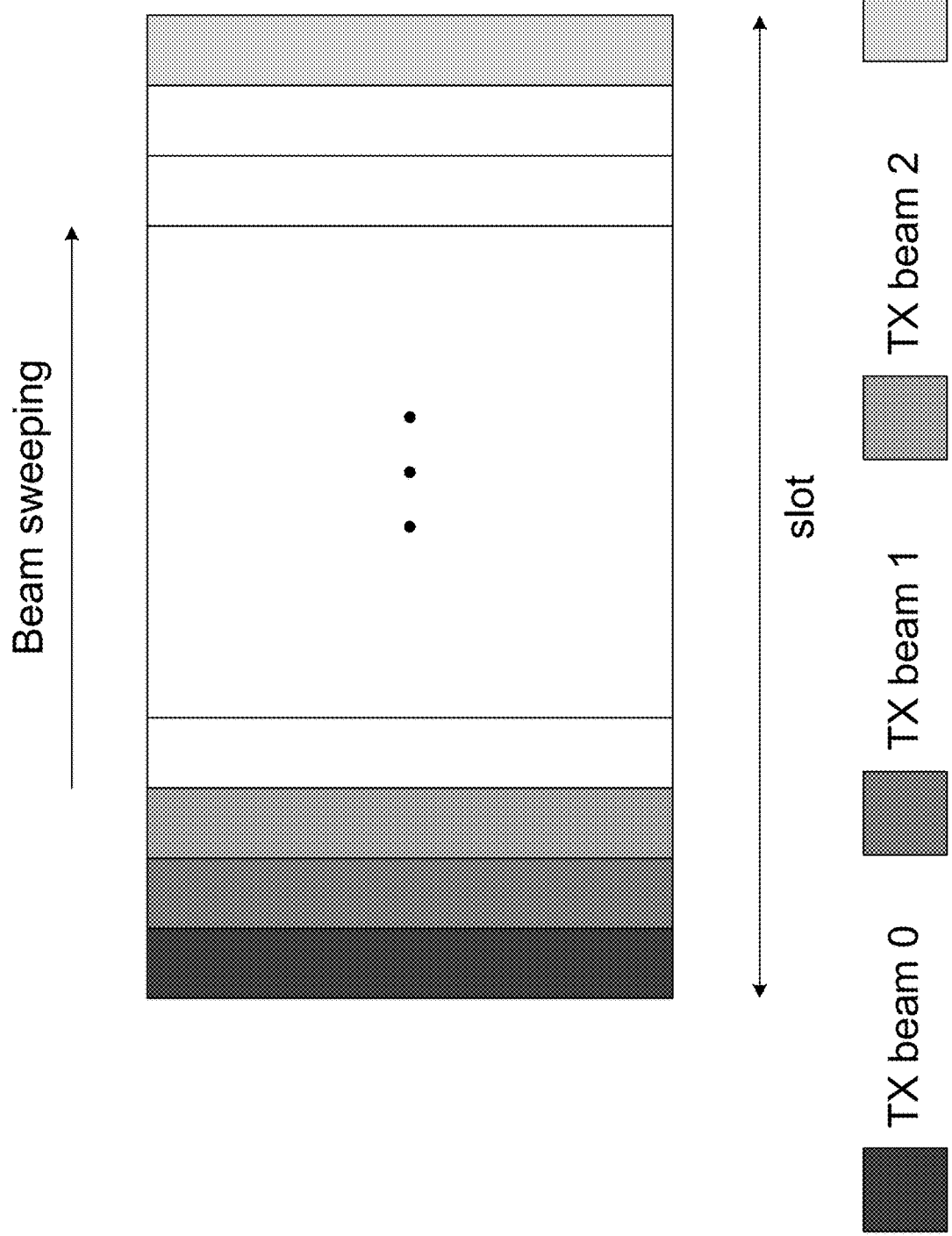
FIG. 6 is a diagram illustrating an example of a beam sweeping operation for the transmission of common control message where one beam is applied on each symbol within one slot, according to various aspects discussed herein.

In various aspects discussed herein, in scenarios involving multiple beam operation, beam sweeping can be performed (e.g., via communication circuitry 520 applying distinct sets of beamforming weights selected by processor(s) 510 at different times (e.g., different symbols, etc.)) for the transmission of common control messages (e.g., generated by processor(s) 510, transmitted via communication circuitry 520, received via transceiver circuitry 420, and processed by processor(s) 410). Referring to FIG. 6, illustrated is a diagram showing an example of a beam sweeping operation for the transmission of common control message where one beam is applied on each symbol within one slot, according to various aspects discussed herein. Note that in case when the NR NodeB (gNB (next generation NodeB)) is equipped with multiple antenna arrays or panels, multiple beams can be formed in each symbol.

As mentioned above, given that the payload size for the transmission of common control message(s) (e.g., including paging messages, RMSI, OSI and random access response (RAR) messages) can vary depending on specific deployment scenarios and use cases, in various aspects discussed herein, the control channel can be employed to carry scheduling information (e.g., including MCS and resource allocation) for the transmission of common control message(s).

In various aspects, a control channel design carrying scheduling information can be provided based on one or more of the following options:

In a first option for control channel design, a dedicated physical signal or channel in the DL (e.g., generated by processor(s) 510, transmitted via communication circuitry 520, received via transceiver circuitry 420, and processed by processor(s) 410) can be used to carry scheduling information (e.g., including MCS and resource allocation) for the transmission of common control message(s) (e.g., generated by processor(s) 510, transmitted via communication circuitry 520, received via transceiver circuitry 420, and processed by processor(s) 410). As one specific example, the dedicated signal or channel can be designed similar to the Physical Control Format Indicator Channel (PCFICH). For example, the physical TDD (Time Division Duplexing) configuration indicator channel (PTCICH) can be reused to indicate the scheduling information for the transmission of common control message(s). In some aspects, if there is no paging configuration, transmission of this dedicated physical signal or channel can be omitted. Alternatively, this dedicated signal or channel could always be transmitted, but one payload type (e.g., undefined MCS or undefined resource allocation, etc.) can be used to indicate that no paging is transmitted.

In a second option for control channel design, NR PDCCH with common search space (e.g., via generated by processor(s) 510, transmitted via communication circuitry 520, received via transceiver circuitry 420, and processed by processor(s) 410) can be employed to schedule the transmission of common control message(s). Further, configuration information for NR PDCCH with common search space (e.g., numerology, resource allocation in time (symbol/slot/frame index) and frequency domain, etc.) can be indicated in the NR minimum system information (MSI) or NR synchronization signal which can comprise the NR primary synchronization signal (NR PSS) and/or NR secondary synchronization signal (NR SSS) (e.g., generated by processor(s) 510, transmitted via communication circuitry 520, received via transceiver circuitry 420, and processed by processor(s) 410).

To randomize the inter-cell interference, the resource for NR PDCCH with common search space can be defined as a function of one or more of a physical cell ID, a virtual cell ID, or symbol/slot/subframe/frame index. In scenarios involving multiple beam operation for the transmission (e.g., via communication circuitry 520) of common control message(s) (e.g., generated by processor(s) 510), it can be advantageous to limit the number of blind decoding attempts within each symbol to reduce UE power consumption and receiver complexity.

For both options mentioned above (e.g., either dedicated control channel/signal or NR PDCCH with common search space carrying scheduling information), a distributed transmission scheme can be employed (e.g., by processor(s) 510 and communication circuitry 520) to improve the robustness of the control channel. For example, control channels/signals (e.g., generated by processor(s) 510) can be transmitted (e.g., via communication circuitry 520) in non-contiguous resources within one symbol duration.

Additionally, shared demodulation reference signal (DM-RS) can be defined for both control channel/signals and the data channel carrying common control message(s). A shared DM-RS can help improve the channel estimation performance (e.g., by processor(s) 410) for both control channel/signals and data channel, and can potentially reduce UE receiver complexity. In one example, the same DM-RS pattern can be used for both control channel/signal and data channel carrying common control message(s). Additionally, in aspects, the same transmission mode (e.g., space frequency block code (SFBC), etc.) can be used (e.g., by processor(s) 510 and communication circuitry 520) for both control channels/signals and data channel carrying common control message.

In scenarios involving beam sweeping, other configurations (e.g., including numerologies and the number of symbols within a slot and/or the number of slots used for the transmission of common control messages) can be configured by higher layers via NR MSI, NR RMSI, NR OSI or RRC signaling (e.g., generated by processor(s) 510, transmitted via communication circuitry 520, received via transceiver circuitry 420, and processed by processor(s) 410). In aspects employing NR RMSI, NR OSI or RRC signaling, NR RMSI, NR OSI or RRC signaling can be used to configure the transmission (e.g., via communication circuitry 520) of paging messages and/or RAR messages (e.g., generated by processor(s) 510). Alternatively, the number of symbols within a slot and/or the number of slots for the transmission of common control messages can be indicated in the control channel/signals (e.g., generated by processor(s) 510, transmitted via communication circuitry 520, received via transceiver circuitry 420, and processed by processor(s) 410), as discussed above.

Multiplexing Schemes of Control Channel/Signals and Data Channel Carrying Common Control Message In various aspects, control channel carrying scheduling information and data channel carrying common control message(s) can be multiplexed (e.g., by processor(s) 510 and communication circuitry 520) in a time division multiplexing (TDM), a frequency division multiplexing (FDM) manner, or a combination thereof. Additionally, in various aspects, these two channels/signals (e.g., generated by processor(s) 510) can be transmitted (e.g., via communication circuitry 520) within a same symbol/slot or across different slots. In the latter scenario (across different slots), cross slot scheduling can be employed (e.g., by processor(s) 510) to schedule the transmission (e.g., via communication circuitry 520) of common control message(s) (e.g., generated by processor(s) 510).

In various aspects, one or more of the following options for multiplexing of control channel/signals and data channel can be employed.

In a first option, the control channel/signal and the data channel carrying common control message(s) can be multiplexed (e.g., by processor(s) 510 and communication circuitry 520) in a FDM (Frequency Division Multiplexing) manner within a common duration (e.g., of one or more symbols). In various aspects, these two channels can use the same or different numerology from a reference numerology. In the latter case, the control channel/signal and the data channel can employ a larger subcarrier spacing to allow more beams to be swept within a slot. For example, in a scenario wherein 60 kHz is used as a reference numerology, the control channel/signal and data channel can use a larger subcarrier spacing, for example, 120 kHz or 240 kHz.

Figure 7:
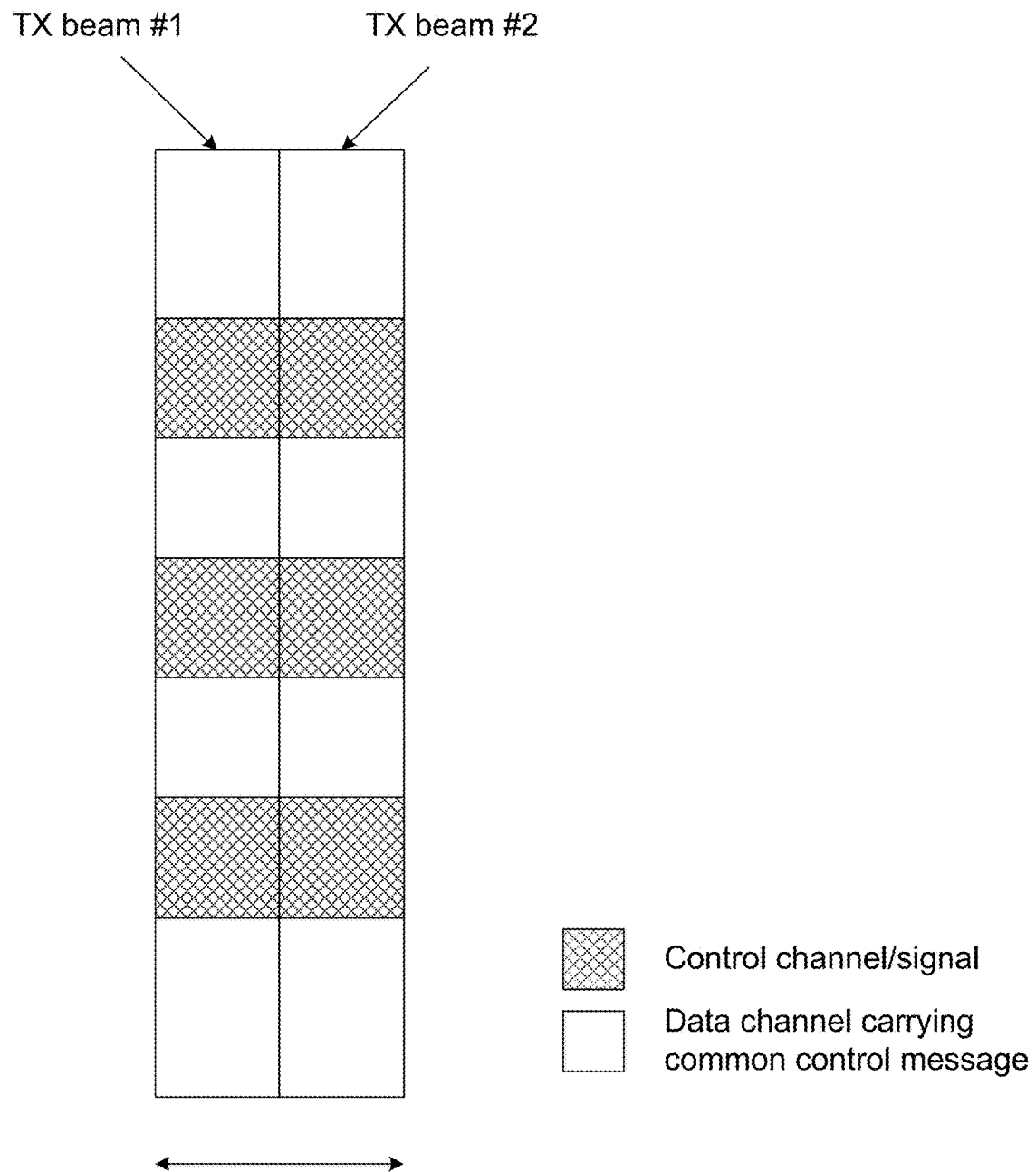
FIG. 7 is a diagram illustrating an example of FDM based multiplexing between control channels/signals and data channel carrying common control message(s), according to various aspects discussed herein.

Referring to FIG. 7, illustrated is a diagram showing an example of FDM based multiplexing between control channels/signals and data channel carrying common control message(s), according to various aspects discussed herein. In the example of FIG. 7, 60 kHz is used as reference subcarrier spacing and 120 kHz is used as subcarrier spacing for the control and data channels. In the scenario shown in FIG. 7, 2 Tx (transmit) beams can be employed for transmission (e.g., via communication circuitry 520) of common control message(s) (e.g., generated by processor(s) 510).

In some aspects, the same Tx beam can be applied for control and data channel carrying common control message(s) within one symbol duration. In such scenarios, the same information (e.g., generated by processor(s) 510) can be repeated and transmitted (e.g., by communication circuitry 520) on two or more mini-symbols within one symbol duration using the same Tx beam. This transmission scheme can help improve the performance of frequency offset tracking (e.g., by processor(s) 410). In such scenarios, the UE can calculate (e.g., via processor(s) 410) the phase difference on data and control channel REs (e.g., received via transceiver circuitry 420) between two mini-symbols to estimate the frequency offset. To achieve this, a scrambling seed for the transmission of data channel carrying common control message(s) on different OFDM (Orthogonal Frequency Division Multiplexing) symbols (or OFDM-based symbols) can be defined as a function of the symbol index using reference numerology.

In aspects, to minimize the UE power consumption, a 1:1 Tx beam mapping between SS (synchronization signals)/PBCH (NR (New Radio) Physical Broadcast Channel) and common control message transmission can be defined. If the SS block has only 1 antenna port, the 1:1 Tx beam mapping can indicate that the transmission direction for each polarization of the common control message(s) is the same as the SS block. In such a scenario, the UE can listen (e.g., via processor(s) 410 and transceiver circuitry 420) to only one symbol or some symbols to achieve repetition gain for the decoding (e.g., via processor(s) 410) of common control message(s). In one example, the UE can decode (e.g., via processor(s) 410) PBCH successfully on symbol #3 in Tx beam group #1, and the UE can decode (e.g., via processor(s) 410) paging message(s) on symbol #3 or symbol #2-#4, where the highly correlated Tx beams can be applied on the corresponding paging slot using the same Rx beams.

In various aspects, the control channel/signal and data channel carrying common control message(s) (e.g., generated by processor(s) 510) can be transmitted (e.g., via communication circuitry 520) within a same nominal symbol using a larger subcarrier spacing than a reference numerology, and can be multiplexed (e.g., by processor(s) 510 and communication circuitry 520) in a TDM (Time Division Multiplexing) and/or FDM (Frequency Division Multiplexing) manner, or a combination thereof.

Figure 8:
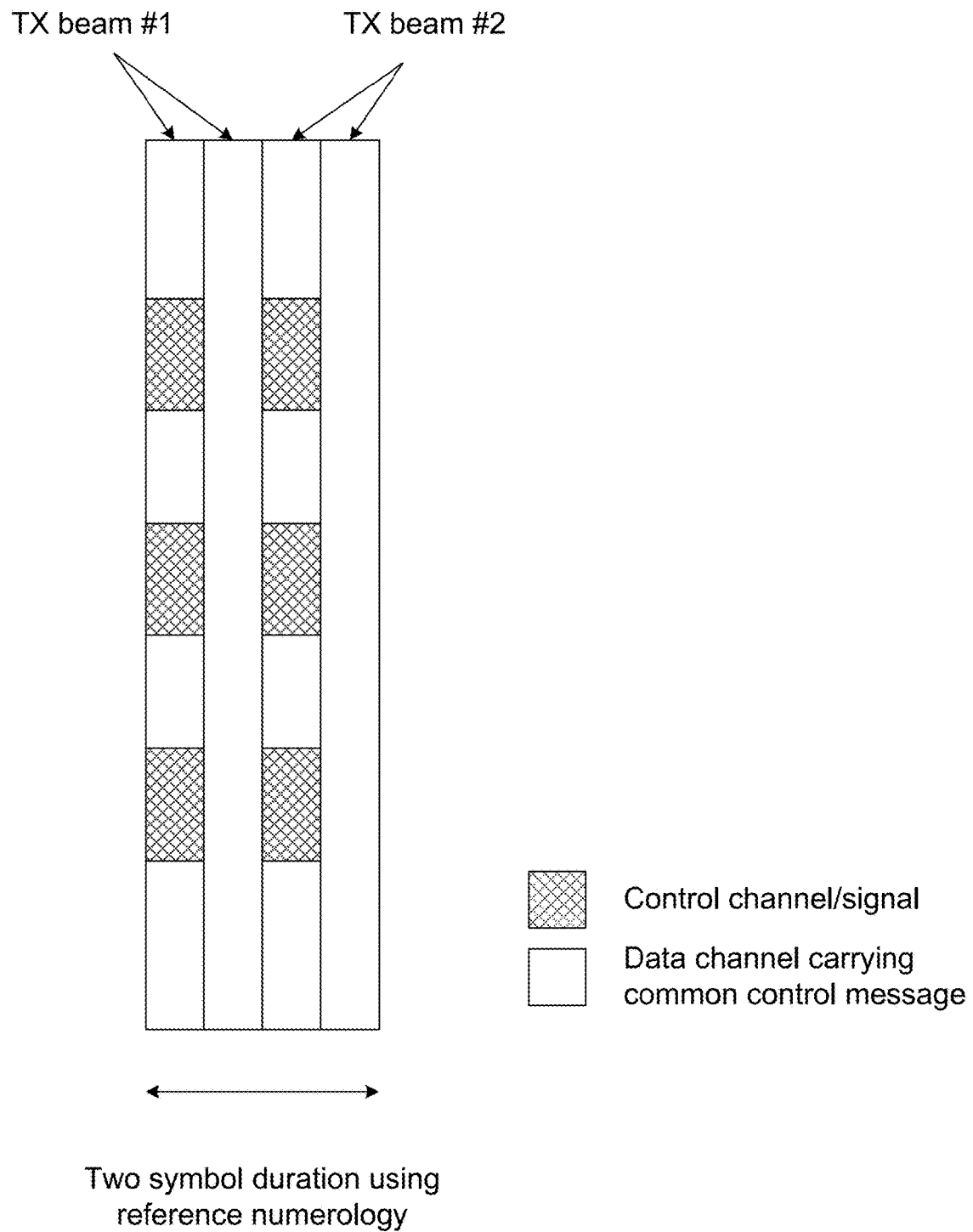
FIG. 8 is a diagram illustrating an example of TDM and FDM based multiplexing between control channels/signals and a data channel carrying common control message(s), according to various aspects discussed herein.

Referring to FIG. 8, illustrated is a diagram showing an example of TDM and FDM based multiplexing between control channels/signals and a data channel carrying common control message(s), according to various aspects discussed herein. In the example of FIG. 8, 60 kHz is used as the reference subcarrier spacing and 240 kHz is used as a subcarrier spacing for control and data channels (e.g., generated by processor(s) 510, transmitted via communication circuitry 520, received via transceiver circuitry 420, and processed by processor(s) 410). Additionally, in the example of FIG. 8, the control and data channels carrying the common control message(s) can span two mini-symbols using 240 kHz using the same Tx beam. In the example of FIG. 8, the control channel carrying scheduling information (e.g., generated by processor(s) 510) can be transmitted (e.g., via communication circuitry 520) in the first mini-symbol while data channel carrying common control message(s) (e.g., generated by processor(s) 510) can be transmitted (e.g., via communication circuitry 520) in the first and second mini-symbol within the same Tx beam.

In connection with the above options and/or techniques, the control channel/signal and/or data channel carrying common control message(s) (e.g., generated by processor(s) 510) can be transmitted (e.g., via communication circuitry 520) within the synchronization signal burst (SS burst), where multiple SS blocks including NR PSS (Primary SS), SSS (Secondary SS) and/or NR physical broadcast channel (NR PBCH) can be transmitted. Additionally, in aspects, the control channel/signal and/or the data channel carrying common control message(s) can employ the same numerology as the SS block to allow efficient beam operation. Such aspects can help to reduce the number of slots when operated in a beam-sweeping mode, which can potentially improve system level spectrum efficiency.

In various aspects, given that the periodicity for the transmission of PBCH and synchronization signal can be different, the resource which is not used for PBCH in some SS burst(s) can be used for the transmission (e.g., via communication circuitry 520) of control channel/signal and/or data channel carrying common control message(s) (e.g., generated by processor(s) 510).

Figure 9:
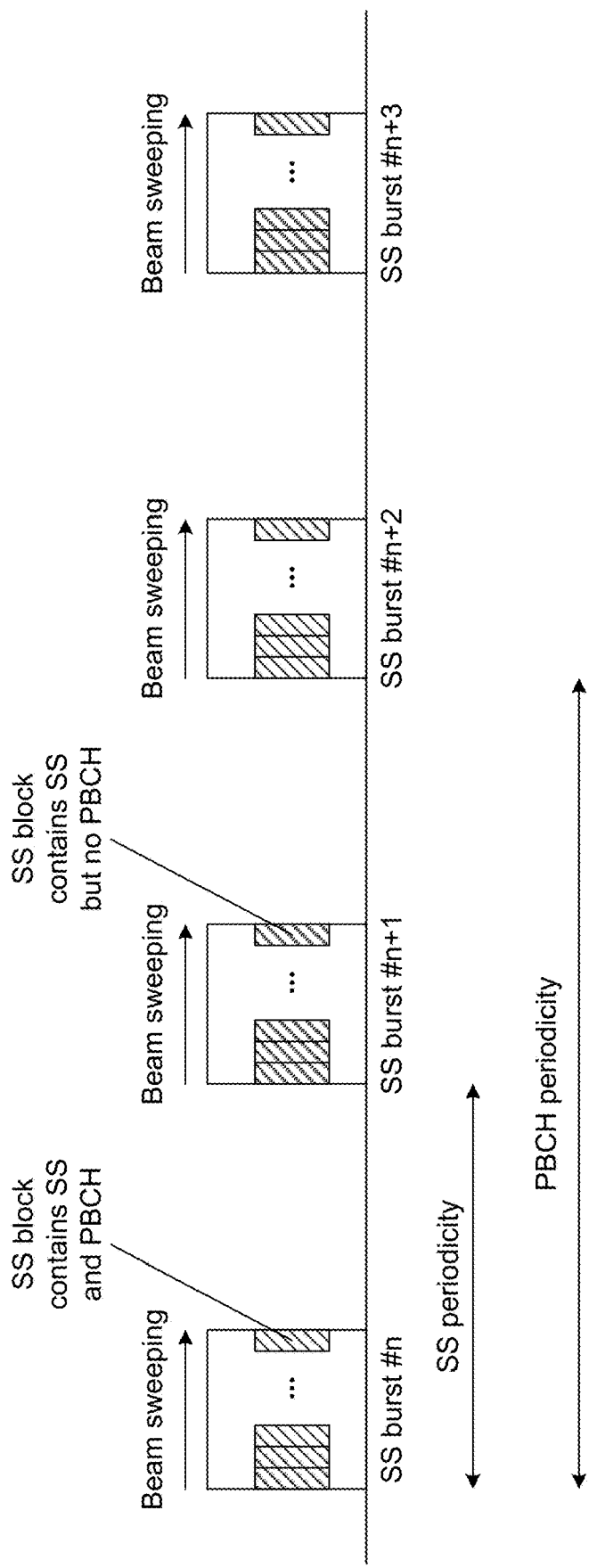
FIG. 9 is a diagram illustrating one example of a SS burst structure, in connection with various aspects discussed herein.

Referring to FIG. 9, illustrated is a diagram showing one example of a SS burst structure, in connection with various aspects discussed herein. In the example of FIG. 9, in SS burst #n, each SS block contains SS and PBCH, while in SS burst #n+1, each block contains SS but not PBCH. Additionally, in various aspects discussed herein, in SS burst #n+1, the resource which is not used for PBCH transmission can be allocated (e.g., by processor(s) 510) for the transmission (e.g., via communication circuitry 520) of control channel/signal and/or data channel carrying common control message(s) (e.g., generated by processor(s) 510).

In various aspects, in some SS bursts, the resource which is not used for the PBCH transmission can be allocated (e.g., by processor(s) 510) for the control channel carrying scheduling information (e.g., generated by processor(s) 510) for the transmission of common control message(s). Additionally, in aspects, cross-slot scheduling can be employed (e.g., by processor(s) 510), such that common control message(s) can be scheduled K slot(s) after transmission (e.g., by communication circuitry 520) of control channel/signal (e.g., by processor(s) 510), where K>0 can be predefined in the specification or configured by higher layers in NR MIB or dynamically indicated in the control channel/signal (e.g., generated by processor(s) 510, transmitted via communication circuitry 520, received via transceiver circuitry 420, and processed by processor(s) 410).

Figure 10:
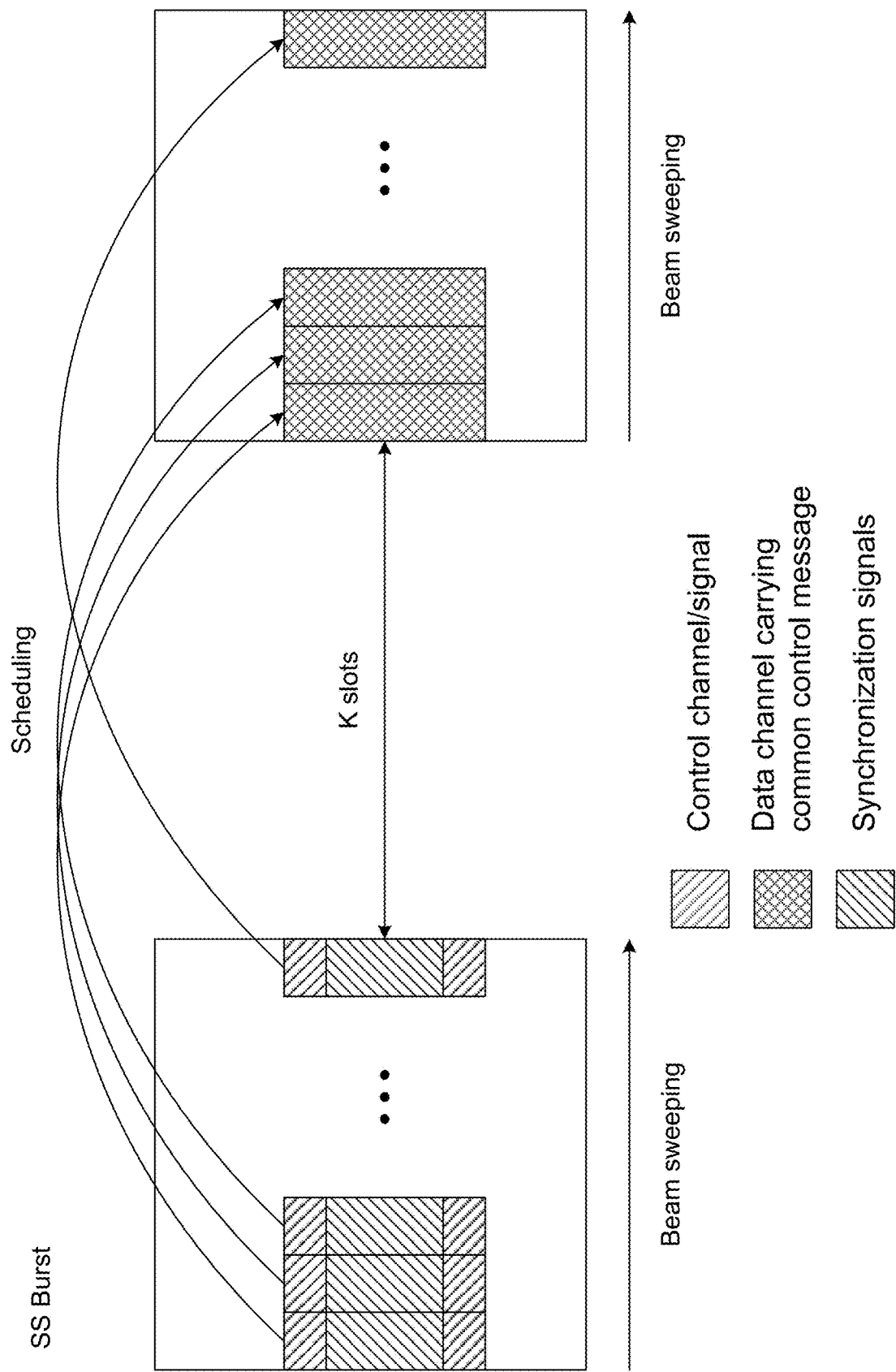
FIG. 10 is a diagram illustrating one example of cross-slot scheduling for common control message(s), according to various aspects discussed herein.

Referring to FIG. 10, illustrated is a diagram showing one example of cross-slot scheduling for common control message(s), according to various aspects discussed herein. In the example, common control message(s) can be scheduled (e.g., via control channel/signal generated by processor(s) 510, transmitted via communication circuitry 520, received via transceiver circuitry 420, and processed by processor(s) 410) K slots after the control channel/signal in one SS burst. In aspects, beam sweeping can be applied (e.g., by communication circuitry 520 based on sets of beamforming weights selected by processor(s) 510) for both control channel/signal and data channel carrying common control message(s).

In scenarios wherein this mechanism is applied for the SIB transmission, the SS burst slot index used for the control channel carrying scheduling information for the SIB transmission can be predefined in the specification or configured by higher layers via NR MIB (e.g., generated by processor(s) 510, transmitted via communication circuitry 520, received via transceiver circuitry 420, and processed by processor(s) 410). For example, the control channel carrying scheduling information (e.g., generated by processor(s) 510) for SIB transmission can be transmitted (e.g., by communication circuitry 520) in $25^{th}$ slots within 10 ms, with periodicity of 20 ms.

Additionally, in scenarios wherein this mechanism is applied for the paging transmission, the SS burst slot index used for the control channel carrying paging transmission scheduling information can be aligned with a paging occasion (PO). In one example, after a UE derives (e.g., via processor(s) 410) a paging radio frame (Paging Frame (PF)) and slot within that PF (Paging Occasion (PO)), the UE can monitor (e.g., via transceiver circuitry 420 and processor(s) 410) the next available SS burst which can carry control channel for paging channel scheduling information.

In various aspects, in some SS bursts, a resource which is not used for the PBCH transmission can be allocated (e.g., by processor(s) 510) for the data channel carrying common control message(s). In various aspects, the scheduling information for the responding data channel can be indicated in the NR MSI (e.g., generated by processor(s) 510, transmitted via communication circuitry 520, received via transceiver circuitry 420, and processed by processor(s) 410). Given that the size of common control message (e.g., NR SIB) can be larger than NR MIB, the resource allocated for the SIB transmission can be greater than that for the MIB transmission.

Figure 11:
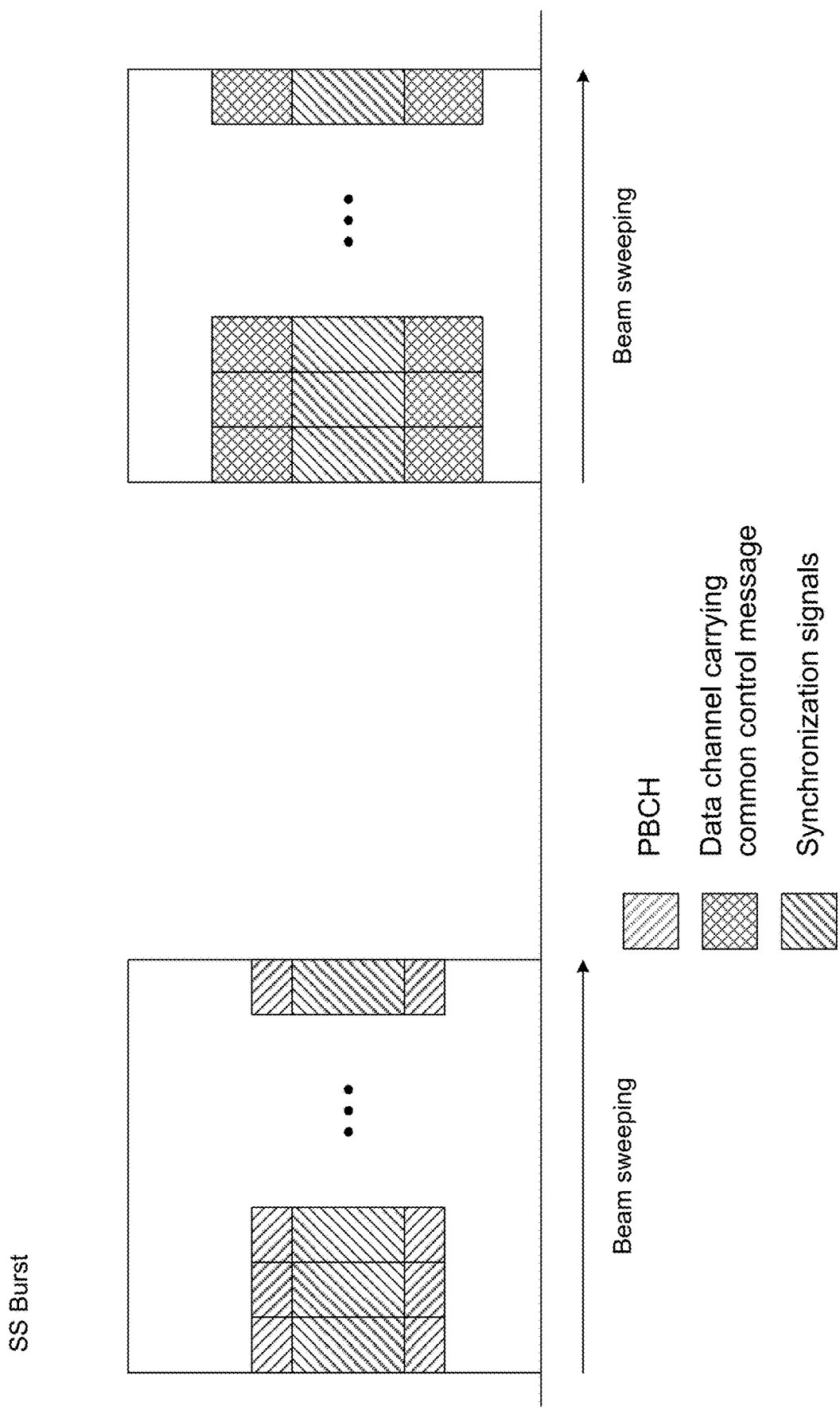
FIG. 11 is a diagram illustrating one example of resource allocation for common control message transmission, according to various aspects discussed herein.

Referring to FIG. 11, illustrated is a diagram showing one example of resource allocation for common control message transmission, according to various aspects discussed herein. In the example of FIG. 11, in SS burst #n, PBCH is included in each SS block, while in SS burst #n+1, the resource allocated for PBCH can be used for common control channel transmission. Additionally, in scenarios wherein a larger subcarrier spacing is used for SS and common control channel, a repeated structure as that discussed in connection with FIG. 7 can be employed for the transmission (e.g., via communication circuitry 520) of common control channel (e.g., generated by processor(s) 510) to help improve frequency offset tracking performance (e.g., by processor(s) 410).

In various aspects, techniques and/or options discussed above can also be used to transmit (e.g., via communication circuitry 520) the common control message(s) associated with the beam management CSI-RS (e.g., generated by processor(s) 510), which is periodic and can be used (e.g., by processor(s) 410) to decode the broadcasting signal (e.g. NR RMSI or OSI) when the period of CSI-RS and the broadcasting signal is different.

In various aspects, control channels/signals carrying scheduling information (e.g., generated by processor(s) 510) and data channel carrying common control message(s) (e.g., generated by processor(s) 510) can be multiplexed (e.g., by processor(s) 510 and communication circuitry 520) in a TDM manner within one slot. In aspects, such techniques can be employed (e.g., by system 500) for the transmission of multiple RAR messages using different Tx beams in case of partial or non-reciprocity.

Figure 12:
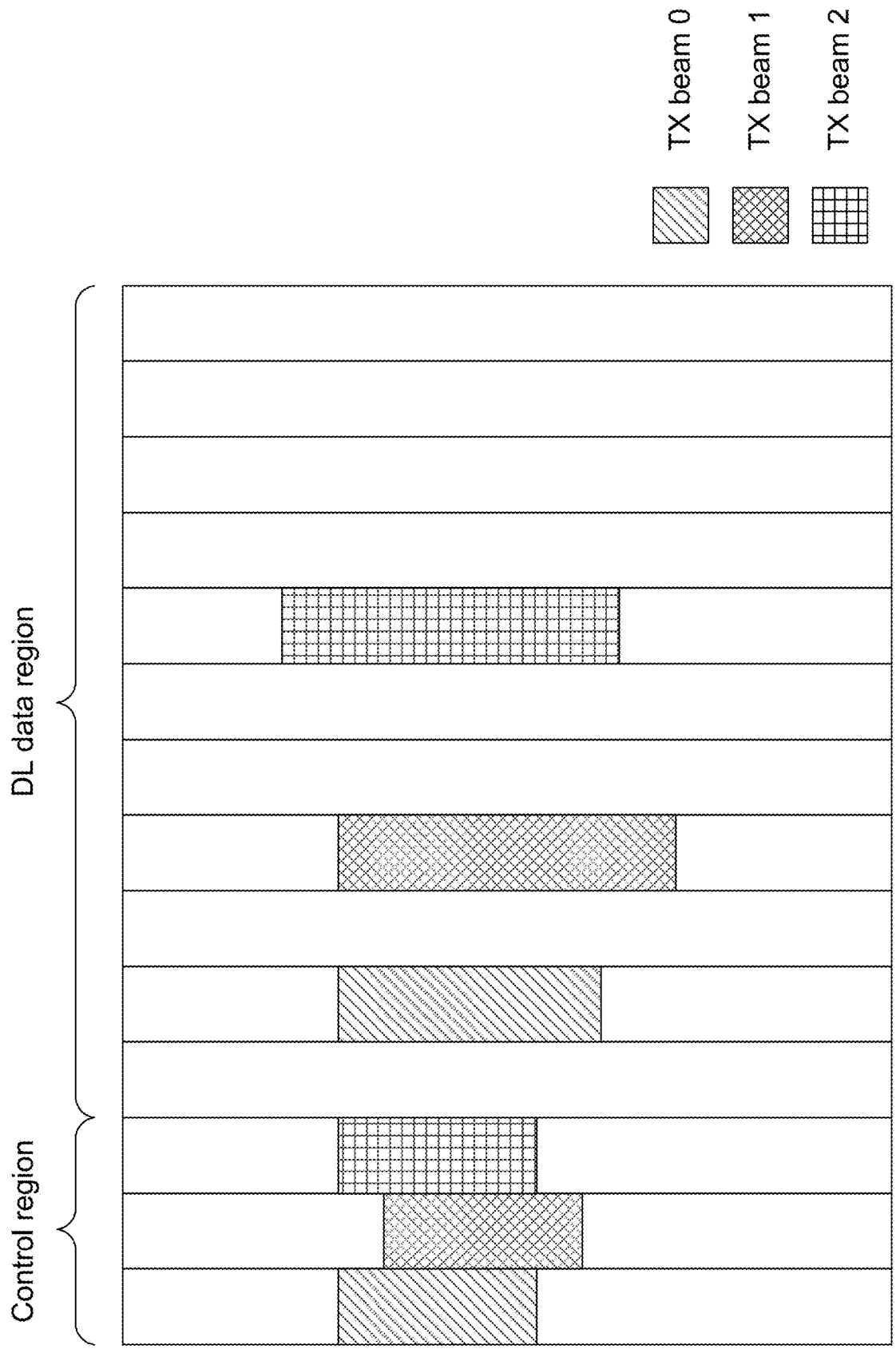
FIG. 12 is a diagram illustrating one example of TDM-based multiplexing of control channel and data channel carrying common control message(s) within one slot, according to various aspects discussed herein.

Referring to FIG. 12, illustrated is a diagram showing one example of TDM-based multiplexing of control channel and data channel carrying common control message(s) within one slot, according to various aspects discussed herein. In the example of FIG. 12, NR PDCCHs with common search space (e.g., generated by processor(s) 510) using different Tx beams can be transmitted (e.g., via communication circuitry 520) in the control region and can be used to schedule the transmission of common control message(s) in the data region. In aspects, the same beam can be applied (e.g., by processor(s) 510 and communication circuitry 520) for the NR PDCCH with common search space and scheduled data transmission (e.g., generated by processor(s) 510).

In various aspects, the above techniques can be applied for the transmission (e.g., via communication circuitry 520) of Message 3 (e.g., generated by processor(s) 510) using multiple beam transmission within the same slot in the 4-step RACH procedure. Additionally, in aspects, the same slot or cross slot scheduling can be applied (e.g., by processor(s) 510) for the transmission (e.g., via communication circuitry 520) of Message 3 using multiple beams.

Additional Embodiments

Figure 13:
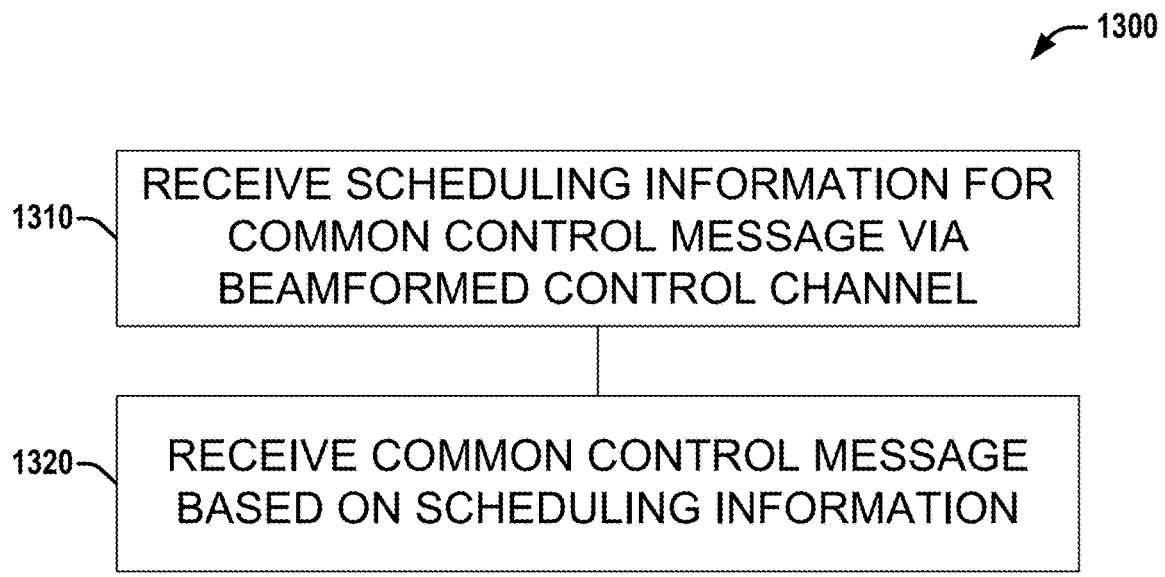
FIG. 13 is a flow diagram of an example method employable at a UE that facilitates reception of common control message(s) in connection with beamformed operation, according to various aspects discussed herein.

Referring to FIG. 13, illustrated is a flow diagram of an example method 1300 employable at a UE that facilitates reception of common control message(s) in connection with beamformed operation, according to various aspects discussed herein. In other aspects, a machine readable medium can store instructions associated with method 1300 that, when executed, can cause a UE to perform the acts of method 1300.

At 1310, scheduling information for a common control message can be received via a beamformed transmission of a control channel.

At 1320, the common control message can be received based on the scheduling information.

Additionally or alternatively, method 1300 can include one or more other acts described herein in connection with receiving entity aspects of system 400.

Figure 14:
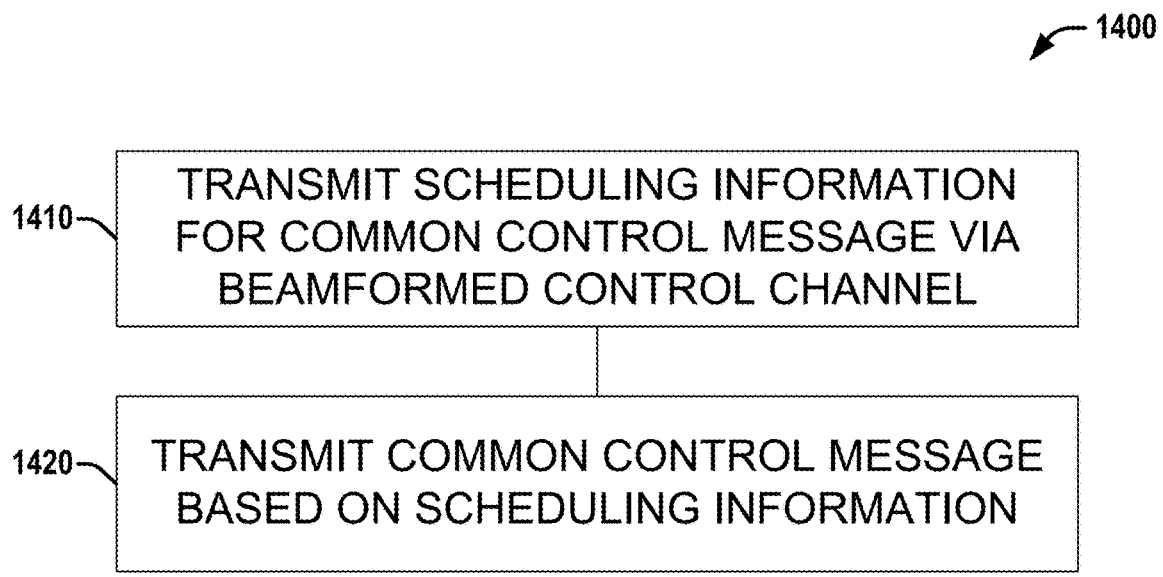
FIG. 14 is a flow diagram of an example method employable at a BS that facilitates transmission of common control message(s) in connection with multi-beam operation, according to various aspects discussed herein.

Referring to FIG. 14, illustrated is a flow diagram of an example method 1400 employable at a BS that facilitates transmission of common control message(s) in connection with multi-beam operation, according to various aspects discussed herein. In other aspects, a machine readable medium can store instructions associated with method 1400 that, when executed, can cause a BS (e.g., eNB, gNB, etc.) to perform the acts of method 1400.

At 1410, scheduling information for a common control message can be transmitted via a beamformed control channel.

At 1420, the common control message can be transmitted based on the scheduling information.

Additionally or alternatively, method 1400 can include one or more other acts described herein in connection with transmitting entity aspects of system 500.

A first example embodiment employable in connection with aspects discussed herein can comprise a system and/or method of wireless communication for a fifth generation (5G) or new radio (NR) system, which can comprise: transmitting (e.g., via communication circuitry 520), by a BS (e.g., eNB, gNB, etc.), a dedicated physical channel or signal or NR physical downlink control channel (NR PDCCH) with common search space (e.g., generated by processor(s) 510) using multiple beams, carrying scheduling information for transmission of a common control message; and transmitting, by the BS (e.g., via communication circuitry 520), the common control message (e.g., generated by processor(s) 510) in accordance with the scheduling information.

In various aspects of the first example embodiment, the common control message (e.g., generated by processor(s) 510) can include at least one of the following messages: a paging message, a system information block (SIB) and a random access response (RAR) message.

In various aspects of the first example embodiment, a dedicated physical signal or channel in the DL (e.g., generated by processor(s) 510, transmitted via communication circuitry 520, received via transceiver circuitry 420, and processed by processor(s) 410) can be used to carry scheduling information including Modulation and Coding Scheme (MCS), resource allocation, and/or number of symbols for the transmission of common control message(s).

In various aspects of the first example embodiment, NR PDCCH with common search space can be employed (e.g., by processor(s) 510) to schedule the transmission of common control message(s) (e.g., generated by processor(s) 510, transmitted via communication circuitry 520, received via transceiver circuitry 420, and processed by processor(s) 410); wherein configuration information for NR PDCCH with common search space (e.g., numerology, resource allocation in time (symbol/slot/frame index) and frequency domain, etc.) can be indicated in the NR synchronization signal (e.g., including NR primary synchronization signal (NR PSS) and/or NR secondary synchronization signal (NR SSS)) or NR master information block (NR MIB) (e.g., generated by processor(s) 510, transmitted via communication circuitry 520, received via transceiver circuitry 420, and processed by processor(s) 410).

In various aspects of the first example embodiment, shared demodulation reference signal (DM-RS) can be defined and employed (e.g., by processor(s) 510) for both control channel/signals and data channel carrying common control message(s).

In various aspects of the first example embodiment, other configurations including numerologies and the number of symbols within a slot and/or the number of slots used for the transmission of common control message(s) can be configured by higher layers via NR MIB, NR SIB or RRC signaling or dynamically indicated in the control channel/signals (e.g., via higher layer signaling or DCI (Downlink Control Information) generated by processor(s) 510, transmitted via communication circuitry 520, received via transceiver circuitry 420, and processed by processor(s) 410).

In a further set of aspects of the first example embodiment, control channel carrying scheduling information and data channel carrying common control message(s) can be multiplexed (e.g., by processor(s) 510 and communication circuitry 520) in a time division multiplexing (TDM) or frequency division multiplexing (FDM) manner or a combination thereof; wherein the control channel and data channel (e.g., generated by processor(s) 510) can be transmitted (e.g., by communication circuitry 520) within a same symbol/slot or across different slots using a same Tx beam (e.g., generated by communication circuitry 520 based on beamforming weights selected by processor(s) 510).

In various aspects of the further set of aspects of the first example embodiment, the control channel/signal and data channel carrying common control message(s) (e.g., generated by processor(s) 510) can be multiplexed (e.g., by processor(s) 510) in a FDM manner within a same symbol duration, using the same or a different numerology from a reference numerology.

In various aspects of the further set of aspects of the first example embodiment, a one to one Tx beam mapping between synchronization signals and/or NR physical broadcast channel (NR PBCH) and common control message transmission can be defined and employed (e.g., by processor(s) 510).

In various aspects of the further set of aspects of the first example embodiment, control channel/signal and data channel carrying common control message(s) (e.g., generated by processor(s) 510) can be transmitted (e.g., by communication circuitry 520) within a same nominal symbol using a larger subcarrier spacing than the reference numerology.

In various aspects of the further set of aspects of the first example embodiment, control channel/signal and/or data channel carrying common control message(s) (e.g., generated by processor(s) 510) can be transmitted (e.g., by communication circuitry 520) within the synchronization signal burst (SS burst), where multiple SS blocks (e.g., each of which can be generated by processor(s) 510 and can comprise NR PSS, SSS and/or NR physical broadcast channel (NR PBCH)) can be transmitted (e.g., via communication circuitry 520); wherein control channel/signal and/or data channel carrying common control message(s) (e.g., generated by processor(s) 510) can employ the same numerology as the SS block.

In various aspects of the further set of aspects of the first example embodiment, the resource which is not used for PBCH in some synchronization signal burst (SS burst) can be used (e.g., by processor(s) 510 and communication circuitry 520) for the transmission of control channel/signal and/or data channel carrying common control message(s). In various such aspects, in some synchronization signal burst(s) (SS burst(s)), the resource which is not used for the PBCH transmission can be allocated (e.g., by processor(s) 510) for the control channel carrying scheduling information for the transmission of common control message using same or cross slot scheduling. In various such aspects, the synchronization signal burst (SS burst) slot index used for the control channel carrying scheduling information for the SIB transmission can be predefined in the specification or can be configured by higher layers via NR MIB (e.g., generated by processor(s) 510, transmitted via communication circuitry 520, received via transceiver circuitry 420, and processed by processor(s) 410). In various such aspects, the synchronization signal burst (SS burst) slot index used for the control channel carrying paging transmission scheduling information can be aligned (e.g., by processor(s) 510) with a paging occasion (PO). In various such aspects, in some synchronization signal bursts (SS burst), the resource which is not used for the PBCH transmission can be allocated (e.g., by processor(s) 510) for the data channel carrying common control message(s).

In various aspects of the first example embodiment, control channels/signals carrying scheduling information and data channel carrying common control messages can be multiplexed (e.g., by processor(s) 510 and communication circuitry 520) in a TDM manner within a same slot.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: select a set of receive beamforming weights for a DL (Downlink) control channel, wherein the DL control channel is one of a dedicated physical channel or a NR (New Radio) PDCCH (Physical Downlink Control Channel) with a common search space; process, from the DL control channel, scheduling information associated with a common control message; process the common control message from a DL data channel based at least in part on the scheduling information; and send the common control message to a memory via the memory interface.

Example 2 comprises the subject matter of any variation of any of example(s) 1, wherein the common control message comprises one of a paging message, a NR remaining minimum system information (RMSI), NR other system information (OSI), or a RAR (Random Access Response) message.

Example 3 comprises the subject matter of any variation of any of example(s) 1, wherein the scheduling information comprises one or more of a MCS (Modulation and Coding Scheme) of the common control message, a numerology, a resource allocation of the common control message, or a number of symbols for the common control message.

Example 4 comprises the subject matter of any variation of any of example(s) 1-3, wherein the DL control channel is the NR PDCCH with the common search space, and wherein the processing circuitry is further configured to determine configuration information for the NR PDCCH via one of a NR MSI (minimum system information) or a NR synchronization signal comprising NR PSS (Primary Synchronization Signal) and NR SSS (Secondary Synchronization Signal), wherein the configuration information for the NR PDCCH comprises one or more of a numerology or a resource allocation.

Example 5 comprises the subject matter of any variation of any of example(s) 1-3, wherein both the DL control channel and the DL data channel are associated with a shared DM (Demodulation)-RS (Reference Signal).

Example 6 comprises the subject matter of any variation of any of example(s) 1-3, wherein the processing circuitry is further configured to determine configuration information for the common control message based on one of a DCI (Downlink Control Information) message or higher layer signaling, wherein the configuration information for the common control message comprises one or more of a numerology for the common control message, a number of symbols within a slot for the common control message, or a number of slots for the common control message.

Example 7 comprises the subject matter of any variation of any of example(s) 1-3, wherein the DL control channel and the DL data channel are multiplexed together based on one or more of FDM (Frequency Division Multiplexing) or TDM (Time Division Multiplexing).

Example 8 comprises the subject matter of any variation of any of example(s) 7, wherein the DL control channel and the DL data channel are multiplexed together based on the FDM in a common symbol, based on one of a reference numerology or a numerology with a larger subcarrier spacing than the reference numerology.

Example 9 comprises the subject matter of any variation of any of example(s) 7, wherein one or more of the DL control channel and the DL data channel are within a first SS (Synchronization Signal) burst comprising one or more SS blocks having an associated numerology, wherein the one or more of the DL control channel or the DL data channel have the associated numerology.

Example 10 comprises the subject matter of any variation of any of example(s) 9, wherein the one or more of the DL control channel or the DL data channel are associated with a first set of resources in the first SS burst, wherein the first set of resources is associated with a NR PBCH (Physical Broadcast Channel) in at least one additional SS burst.

Example 11 comprises the subject matter of any variation of any of example(s) 10, wherein the first set of resources comprises the scheduling information, wherein the scheduling information is associated with the common control message as one of same-slot scheduling or cross-slot scheduling.

Example 12 comprises the subject matter of any variation of any of example(s) 10, wherein the processing circuitry is further configured to determine a slot index of the first SS burst based on one of a predefined value or higher layer signaling.

Example 13 comprises the subject matter of any variation of any of example(s) 10, wherein a slot index of the first SS burst is aligned with a PO (Paging Occasion).

Example 14 comprises the subject matter of any variation of any of example(s) 1-2, wherein the scheduling information comprises one or more of a MCS (Modulation and Coding Scheme) of the common control message, a numerology, a resource allocation of the common control message, or a number of symbols for the common control message.

Example 15 comprises the subject matter of any variation of any of example(s) 1-4, wherein both the DL control channel and the DL data channel are associated with a shared DM (Demodulation)-RS (Reference Signal).

Example 16 comprises the subject matter of any variation of any of example(s) 1-5, wherein the processing circuitry is further configured to determine configuration information for the common control message based on one of a DCI (Downlink Control Information) message or higher layer signaling, wherein the configuration information for the common control message comprises one or more of a numerology for the common control message, a number of symbols within a slot for the common control message, or a number of slots for the common control message.

Example 17 comprises the subject matter of any variation of any of example(s) 1-6, wherein the DL control channel and the DL data channel are multiplexed together based on one or more of FDM (Frequency Division Multiplexing) or TDM (Time Division Multiplexing).

Example 18 comprises the subject matter of any variation of any of example(s) 7-8, wherein one or more of the DL control channel and the DL data channel are within a first SS (Synchronization Signal) burst comprising one or more SS blocks having an associated numerology, wherein the one or more of the DL control channel or the DL data channel have the associated numerology.

Example 19 comprises the subject matter of any variation of any of example(s) 10-11, wherein the processing circuitry is further configured to determine a slot index of the first SS burst based on one of a predefined value or higher layer signaling.

Example 20 comprises the subject matter of any variation of any of example(s) 10-12, wherein a slot index of the first SS burst is aligned with a PO (Paging Occasion).

Example 21 is an apparatus configured to be employed in a gNB (next generation Node B), comprising: a memory interface; and processing circuitry configured to: generate scheduling information associated with a common control message; map the scheduling information to an associated set of resources of a DL (Downlink) control channel in each symbol of two or more symbols of a slot, wherein the DL control channel is one of a dedicated physical channel or a NR (New Radio) PDCCH (Physical Downlink Control Channel); select an associated set of beamforming weights for each symbol of the two or more symbols of the slot; generate the common control message; map the common control message to a DL data channel based at least in part on the scheduling information; and send the common control message to a memory via the memory interface.

Example 22 comprises the subject matter of any variation of any of example(s) 21, wherein the processing circuitry is configured to multiplex the DL control channel and the DL data channel via one or both of FDM (Frequency Division Multiplexing) or TDM (Time Division Multiplexing).

Example 23 comprises the subject matter of any variation of any of example(s) 22, wherein the processing circuitry is configured to multiplex the DL control channel and the DL data channel based at least in part on FDM within a common symbol duration, and wherein the DL control channel and the DL data channel have one of a reference numerology or a numerology with a larger subcarrier spacing than the reference numerology.

Example 24 comprises the subject matter of any variation of any of example(s) 22-23, wherein the processing circuitry is further configured to select a set of beamforming weights for the common control message based at least in part on a one-to-one mapping between common control message resources and one of synchronization signals or a NR PBCH (Physical Broadcast Channel).

Example 25 comprises the subject matter of any variation of any of example(s) 22-23, wherein the processing circuitry is configured to map the DL control channel and the DL data channel to a common symbol based on a larger subcarrier spacing than a reference numerology.

Example 26 comprises the subject matter of any variation of any of example(s) 22-23, wherein one or more of the DL control channel and the DL data channel are within a first SS (Synchronization Signal) burst comprising one or more SS blocks having an associated numerology, wherein the one or more of the DL control channel or the DL data channel have the associated numerology.

Example 27 comprises the subject matter of any variation of any of example(s) 26, wherein the one or more of the DL control channel or the DL data channel are associated with a first set of resources in the first SS burst, wherein the first set of resources is associated with a NR PBCH (Physical Broadcast Channel) in at least one additional SS burst.

Example 28 comprises the subject matter of any variation of any of example(s) 26, wherein the processing circuitry is further configured to generate higher layer signaling indicating a slot index of the first SS burst.

Example 29 comprises the subject matter of any variation of any of example(s) 26, wherein a slot index of the first SS burst is aligned with a PO (Paging Occasion).

Example 30 is a machine readable medium comprising instructions that, when executed, cause a gNB (next generation Node B) to: transmit scheduling information associated with a common control message via a beamformed DL (Downlink) control channel in each symbol of two or more symbols of a slot, wherein the DL control channel is one of a dedicated physical channel or a NR (New Radio) PDCCH (Physical Downlink Control Channel); and transmit the common control message via a DL data channel based at least in part on the scheduling information.

Example 31 comprises the subject matter of any variation of any of example(s) 30, wherein the common control message comprises one of a paging message, a NR remaining minimum system information (RMSI), NR other system information (OSI), or a RAR (Random Access Response) message.

Example 32 comprises the subject matter of any variation of any of example(s) 30, wherein the scheduling information comprises one or more of a MCS (Modulation and Coding Scheme) of the common control message, a numerology, a resource allocation of the common control message, or a number of symbols for the common control message.

Example 33 comprises the subject matter of any variation of any of example(s) 30-32, wherein the DL control channel is the NR PDCCH with the common search space, and wherein the instructions, when executed, further cause the gNB to transmit configuration information for the NR PDCCH via one of a NR MSI (minimum system information) or a NR synchronization signal comprising NR PSS (Primary Synchronization Signal) and NR SSS (Secondary Synchronization Signal), wherein the configuration information for the NR PDCCH comprises one or more of a numerology or a resource allocation.

Example 34 comprises the subject matter of any variation of any of example(s) 30-32, wherein both the DL control channel and the DL data channel are associated with a shared DM (Demodulation)-RS (Reference Signal).

Example 35 comprises the subject matter of any variation of any of example(s) 30-32, wherein the instructions, when executed, further cause the gNB to transmit configuration information for the common control message via one of a DCI (Downlink Control Information) message or higher layer signaling, wherein the configuration information for the common control message comprises one or more of a numerology for the common control message, a number of symbols within a slot for the common control message, a numerology, or a number of slots for the common control message.

Example 36 is an apparatus configured to be employed in a gNB (next generation Node B), comprising: means for transmitting scheduling information associated with a common control message via a beamformed DL (Downlink) control channel in each symbol of two or more symbols of a slot, wherein the DL control channel is one of a dedicated physical channel or a NR (New Radio) PDCCH (Physical Downlink Control Channel); and means for transmitting the common control message via a DL data channel based at least in part on the scheduling information.

Example 37 comprises the subject matter of any variation of any of example(s) 36, wherein the common control message comprises one of a paging message, a NR remaining minimum system information (RMSI), NR other system information (OSI), or a RAR (Random Access Response) message.

Example 38 comprises the subject matter of any variation of any of example(s) 36, wherein the scheduling information comprises one or more of a MCS (Modulation and Coding Scheme) of the common control message, a numerology, a resource allocation of the common control message, or a number of symbols for the common control message.

Example 39 comprises the subject matter of any variation of any of example(s) 36-38, wherein the DL control channel is the NR PDCCH with the common search space, and wherein the instructions, when executed, further cause the gNB to transmit configuration information for the NR PDCCH via one of a NR MSI (minimum system information) or a NR synchronization signal comprising NR PSS (Primary Synchronization Signal) and NR SSS (Secondary Synchronization Signal), wherein the configuration information for the NR PDCCH comprises one or more of a numerology or a resource allocation.

Example 40 comprises the subject matter of any variation of any of example(s) 36-38, wherein both the DL control channel and the DL data channel are associated with a shared DM (Demodulation)-RS (Reference Signal).

Example 41 comprises the subject matter of any variation of any of example(s) 36-38, further comprising means for transmitting configuration information for the common control message via one of a DCI (Downlink Control Information) message or higher layer signaling, wherein the configuration information for the common control message comprises one or more of a numerology for the common control message, a number of symbols within a slot for the common control message, a numerology, or a number of slots for the common control message.

Example 42 comprises an apparatus comprising means for executing any of the described operations of examples 1-41.

Example 43 comprises a machine readable medium that stores instructions for execution by a processor to perform any of the described operations of examples 1-41.

Example 44 comprises an apparatus comprising: a memory interface; and processing circuitry configured to: perform any of the described operations of examples 1-41.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a UE (User Equipment), comprising:
a memory interface; and
processing circuitry configured to:
determine configuration information for a beamformed DL (Downlink) control channel via one of a NR MIB (Master Information Block) or a NR synchronization signal comprising NR PSS (Primary Synchronization Signal) and NR SSS (Secondary Synchronization Signal), wherein the beamformed DL control channel is a beamformed NR (New Radio) PDCCH (Physical Downlink Control Channel) with a common search space, and wherein the configuration information for the NR PDCCH comprises one or more of a numerology or a resource allocation;
select a set of receive beamforming weights for the beamformed NR PDCCH;
process scheduling information that is received via the beamformed NR PDCCH and that is associated with a common control message based at least in part on the set of receive beamforming weights, wherein the common control message comprises one of a paging message, a SIB (System Information Block), or a RAR (Random Access Response) message, and wherein the scheduling information comprises one or more of a MCS (Modulation and Coding Scheme) of the common control message, a resource allocation of the common control message, or a number of symbols for the common control message; and
process the common control message, which is received via a beamformed DL data channel, based at least in part on the scheduling information and on the set of receive beamforming weights, wherein the beamformed DL data channel is a beamformed PDSCH (physical downlink shared channel).

2. The apparatus of claim 1, wherein both the beamformed DL control channel and the beamformed DL data channel are associated with a shared DM (Demodulation)-RS (Reference Signal).

3. The apparatus of claim 1, wherein the processing circuitry is further configured to determine configuration information for the common control message based on one of a DCI (Downlink Control Information) message or higher layer signaling, wherein the configuration information for the common control message comprises one or more of a numerology for the common control message, a number of symbols within a slot for the common control message, or a number of slots for the common control message.

4. The apparatus of claim 1, wherein the beamformed DL control channel and the beamformed DL data channel are multiplexed together based on one or more of FDM (Frequency Division Multiplexing) or TDM (Time Division Multiplexing).

5. The apparatus of claim 4, wherein the beamformed DL control channel and the beamformed DL data channel are multiplexed together based on the FDM in a common symbol, based on one of a reference numerology or a numerology with a larger subcarrier spacing than the reference numerology.

6. The apparatus of claim 4, wherein one or more of the beamformed DL control channel and the beamformed DL data channel are within a first SS (Synchronization Signal) burst comprising one or more SS blocks having an associated numerology, wherein the one or more of the beamformed DL control channel or the beamformed DL data channel have the associated numerology.

7. The apparatus of claim 6, wherein the one or more of the beamformed DL control channel or the beamformed DL data channel are associated with a first set of resources in the first SS burst, wherein the first set of resources is associated with a NR PBCH (Physical Broadcast Channel) in at least one additional SS burst.

8. The apparatus of claim 7, wherein the first set of resources comprises the scheduling information, wherein the scheduling information is associated with the common control message as one of same-slot scheduling or cross-slot scheduling.

9. The apparatus of claim 7, wherein the processing circuitry is further configured to determine a slot index of the first SS burst based on one of a predefined value or higher layer signaling.

10. The apparatus of claim 7, wherein a slot index of the first SS burst is aligned with a PO (Paging Occasion).

11. An apparatus configured to be employed in a Base Station (BS), comprising:
a memory interface; and
processing circuitry configured to:
generate configuration information for a beamformed DL (Downlink) control channel, wherein the beamformed DL control channel is a beamformed NR (New Radio) PDCCH (Physical Downlink Control Channel), and wherein the configuration information for the NR PDCCH comprises one or more of a numerology or a resource allocation;
map the configuration information to one of a NR MIB (Master Information Block) or a NR synchronization signal comprising NR PSS (Primary Synchronization Signal) and NR SSS (Secondary Synchronization Signal);
generate scheduling information associated with a common control message, wherein the common control message comprises one of a paging message, a SIB (System Information Block), or a RAR (Random Access Response) message, and wherein the scheduling information comprises one or more of a MCS (Modulation and Coding Scheme) of the common control message, a resource allocation of the common control message, or a number of symbols for the common control message;
map the scheduling information to an associated set of resources of the beamformed NR PDCCH in each symbol of two or more symbols of a slot;
select an associated set of beamforming weights for each symbol of the two or more symbols of the slot;
generate the common control message; and
map the common control message to a beamformed DL data channel based at least in part on the scheduling information, wherein the beamformed DL data channel is a beamformed PDSCH (physical downlink shared channel).

12. The apparatus of claim 11, wherein the processing circuitry is configured to multiplex the beamformed DL control channel and the beamformed DL data channel via one or both of FDM (Frequency Division Multiplexing) or TDM (Time Division Multiplexing).

13. The apparatus of claim 12, wherein the processing circuitry is configured to multiplex the beamformed DL control channel and the beamformed DL data channel based at least in part on FDM within a common symbol duration, and wherein the beamformed DL control channel and the beamformed DL data channel have one of a reference numerology or a numerology with a larger subcarrier spacing than the reference numerology.

14. The apparatus of claim 12, wherein the processing circuitry is further configured to select a set of beamforming weights for the common control message based at least in part on a one-to-one mapping between common control message resources and one of synchronization signals or a NR PBCH (Physical Broadcast Channel).

15. The apparatus of claim 12, wherein the processing circuitry is configured to map the beamformed DL control channel and the beamformed DL data channel to a common symbol based on a larger subcarrier spacing than a reference numerology.

16. The apparatus of claim 12, wherein one or more of the beamformed DL control channel and the beamformed DL data channel are within a first SS (Synchronization Signal) burst comprising one or more SS blocks having an associated numerology, wherein the one or more of the beamformed DL control channel or the beamformed DL data channel have the associated numerology.

17. The apparatus of claim 16, wherein the one or more of the beamformed DL control channel or the beamformed DL data channel are associated with a first set of resources in the first SS burst, wherein the first set of resources is associated with a NR PBCH (Physical Broadcast Channel) in at least one additional SS burst.

18. The apparatus of claim 16, wherein the processing circuitry is further configured to generate higher layer signaling indicating a slot index of the first SS burst.

19. The apparatus of claim 16, wherein a slot index of the first SS burst is aligned with a PO (Paging Occasion).

20. A method, comprising:
transmitting configuration information for a beamformed DL (Downlink) control channel via one of a NR MIB (Master Information Block) or a NR synchronization signal comprising NR PSS (Primary Synchronization Signal) and NR SSS (Secondary Synchronization Signal), wherein the beamformed DL control channel is a beamformed NR (New Radio) PDCCH (Physical Downlink Control Channel), and wherein the configuration information for the NR PDCCH comprises one or more of a numerology or a resource allocation;
transmitting scheduling information associated with a common control message via the beamformed NR PDCCH in each symbol of two or more symbols of a slot, wherein the common control message comprises one of a paging message, a SIB (System Information Block), or a RAR (Random Access Response) message, and wherein the scheduling information comprises one or more of a MCS (Modulation and Coding Scheme) of the common control message, a resource allocation of the common control message, or a number of symbols for the common control message; and
transmitting the common control message via a beamformed DL data channel based at least in part on the scheduling information, wherein the beamformed DL data channel is a beamformed PDSCH (physical downlink shared channel).

21. The method of claim 20, wherein both the beamformed DL control channel and the beamformed DL data channel are associated with a shared DM (Demodulation)-RS (Reference Signal).

22. The method of claim 20, further comprising transmitting configuration information for the common control message via one of a DCI (Downlink Control Information) message or higher layer signaling, wherein the configuration information for the common control message comprises one or more of a numerology for the common control message, a number of symbols within a slot for the common control message, or a number of slots for the common control message.

* * * * *